(12) United States Patent
Chiniwala et al.

(10) Patent No.: US 6,175,622 B1
(45) Date of Patent: Jan. 16, 2001

(54) VIRTUAL PRIVATE NETWORK FOR A TELEPHONE NETWORK

(75) Inventors: Sima Chiniwala, Plano; James B. Welling, Jr., Richardson; Stewart Hodde Maxwell, Dallas; Thanh Pham; Anatoly Vaserfirer, both of Plano, all of TX (US)

(73) Assignee: Northern Telecom Limited, Montreal (CA)

( * ) Notice: Under 35 U.S.C. 154(b), the term of this patent shall be extended for 0 days.

(21) Appl. No.: 09/021,525

(22) Filed: Feb. 10, 1998

Related U.S. Application Data

(60) Provisional application No. 60/038,067, filed on Feb. 18, 1997.

(51) Int. Cl.[7] .................................................. H04Q 11/04
(52) U.S. Cl. ........................... 379/211; 379/207; 379/219; 379/220; 379/221
(58) Field of Search .................... 379/207, 219, 379/220, 221, 265, 211; 455/432, 435, 461

(56) References Cited

U.S. PATENT DOCUMENTS

| | | | |
|---|---|---|---|
| 5,247,571 | * | 9/1993 | Kay et al. .............................. 379/207 |
| 5,329,578 | * | 7/1994 | Brennan et al. ...................... 455/461 |
| 5,333,178 | * | 7/1994 | Norell .................................. 455/461 |
| 5,715,371 | * | 2/1998 | Ahamed et al. ...................... 379/211 |
| 5,796,813 | * | 8/1998 | Sonnenberg ......................... 379/211 |
| 5,862,207 | * | 1/1999 | Aoshima .............................. 379/211 |
| 5,889,845 | * | 3/1999 | Staples et al. ....................... 379/211 |
| 5,926,760 | * | 7/1999 | Khan et al. .......................... 455/435 |
| 5,940,378 | * | 8/1999 | Ushiki et al. ........................ 379/201 |
| 5,940,755 | * | 8/1999 | Scott .................................... 455/461 |
| 5,943,332 | * | 8/1999 | Liu et al. .............................. 455/435 |

\* cited by examiner

*Primary Examiner*—Krista Zele
*Assistant Examiner*—William J. Deane, Jr.
(74) *Attorney, Agent, or Firm*—Haynes and Boone, LLP

(57) ABSTRACT

A system and method for allowing a wireline or wireless carrier or service provider to transparently provide a virtual private network to wireless callers of the network. The method works in a telecommunications network including a service switch point, a service control point, and a first and second telephone. The method provides a virtual private network for the first and second telephone by performing a series of steps. First, an identifier for the first telephone is stored in a memory accessible by the service control point. Next, a first dialed number is received from the first telephone by the service switch point. The service switch point notifies the service control point to determine if the identifier for the first telephone is in the memory. If so, the service control point converts the number dialed by the first telephone to a second dialed number. The service control point then provides the second dialed number, being assigned to the second telephone, to the service switch point. The service switch point may then connect the first and second telephones using the second dialed number.

16 Claims, 2 Drawing Sheets

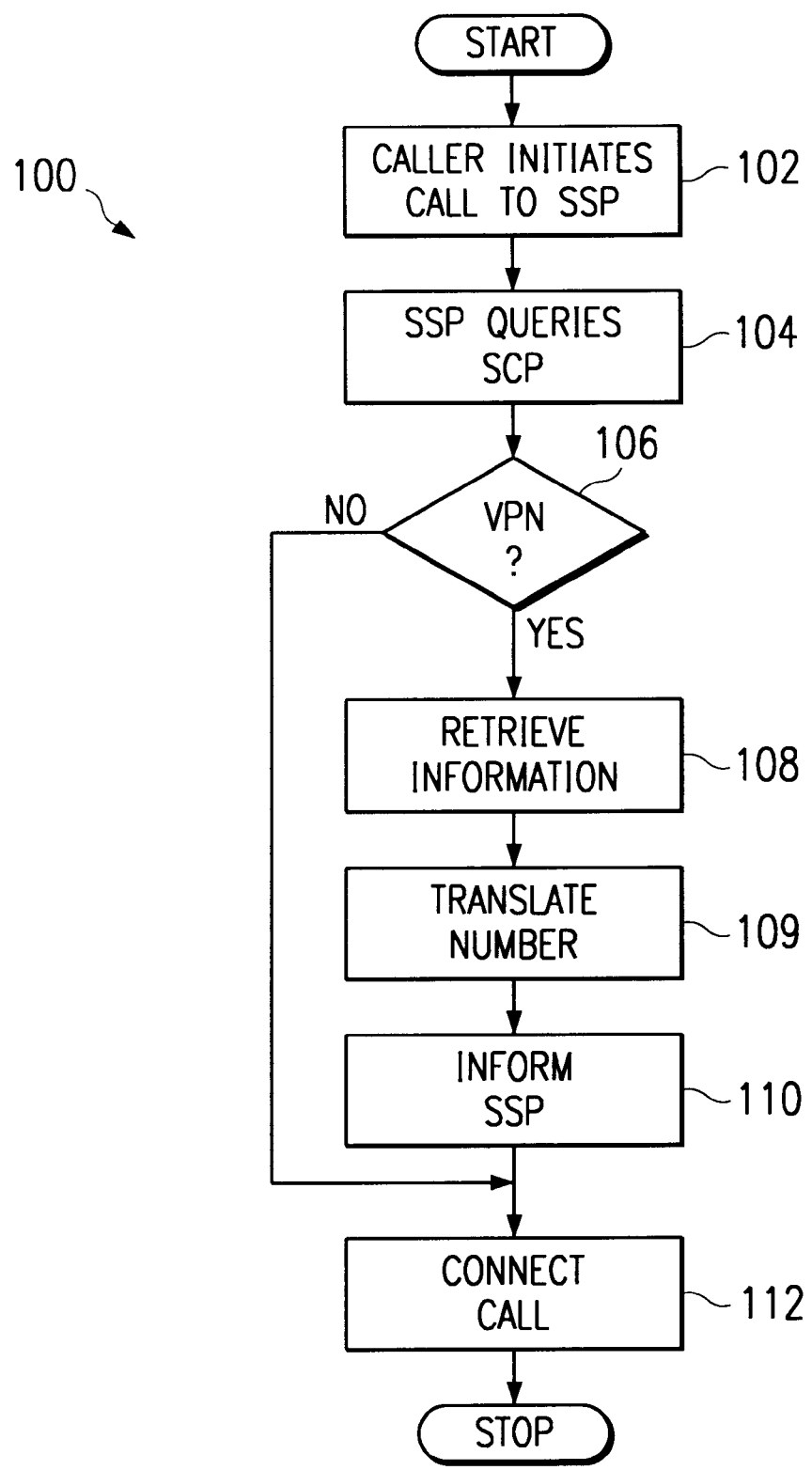

VIRTUAL PRIVATE NETWORK FOR A TELEPHONE NETWORK

CROSS REFERENCE

This invention relies on U.S. Provisional Patent Application Ser. No. 60/038,067, filed Feb. 18, 1997 and entitled "A Method for Providing Telephone Services", which is hereby incorporated by reference.

FIELD OF THE INVENTION

This invention generally relates to telephony services and more particularly to a method and system for providing private network features to subscribers over public or shared facilities.

BACKGROUND

As competition intensifies between service providers of telephony services, providers are looking for services which provide greater value and flexibility for their subscribers. A common service for many users of telephony services, or subscribers, is a private network. A private network allows the subscriber to customize billing and network management of their telephone system.

A common feature of a private network is a dialing plan. A dialing plan can reassign one or more extensions to different numbers. For example, a business may establish a private network with each extension of the network having the same area code and same three number prefix. With a private network, one extension in the business may connect with another extension in the business by only dialing the last four numbers of that extension. Also, pressing the number "0" in a private network will connect to the business receptionist/operator instead of a telephone company operator.

The features of a private network are very convenient and practical except for one drawback—they are not available to mobile users. That is, a subscriber using a cellular telephone, for example, cannot use the same features that are normally provided at an extension in the private network. What is desired, therefore, is a system and method for extending the features of a private network to other extensions, including wireless and/or cellular telephones.

SUMMARY

The method and system disclosed herein allows a wireline or wireless carrier to transparently provide a virtual private network to both wireless (mobile) and wireline (land-line) users. In one embodiment, the method works in a telecommunications network including a service switch point, a service control point, and a first and second telephone. The method provides a virtual private network for the first and/or second telephone by performing a series of steps.

First of all, an identifier for the first telephone is stored in a memory accessible by the service control point. Next, a first dialed number is received from the first telephone by the service switch point. The service switch point notifies the service control point to determine if the identifier for the first telephone is in the memory. If so, the service control point converts the first dialed number to a second dialed number. The service control point then provides the second dialed number, being assigned to the second telephone, to the service switch point. The service switch point may then connect the first and second telephones using the second dialed number.

BRIEF DESCRIPTION OF THE DRAWINGS

The invention will be further understood by reference to the drawings in which:

FIG. 2 provides a flowchart of a method used in the network system of FIG. 1.

DETAILED DESCRIPTION OF THE PREFERRED EMBODIMENT

Figure 1:
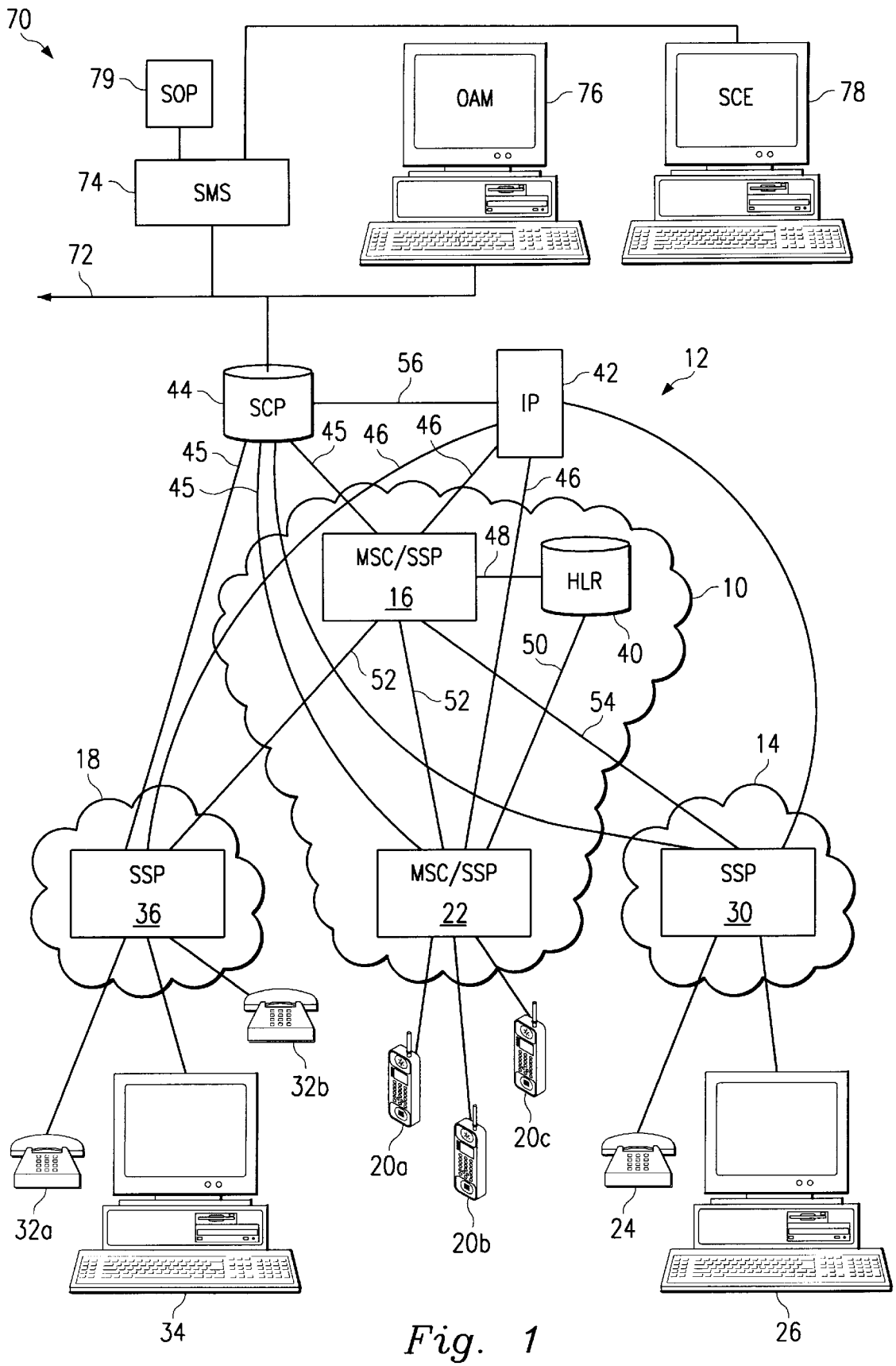
FIG. 1 illustrates a communications network system in accordance with an embodiment of the invention.

The Intelligent Network (IN) architecture has evolved through the efforts of various groups, in particular Bellcore, European Telecommunications Standards Institute (ETSI), International Telecommunications Union (ITU-T), and American National Standards Institute (ANSI). These groups have issued respective documentation defining the general Intelligent Network architecture along with the various entities found within the Network. Advanced Intelligent Network (AIN) is another architecture similar to IN for purposes of the present disclosure. IN and AIN are well known and understood in the industry.

I. Glossary

Terms commonly used in describing an IN architecture and used in the present description are briefly described below:

SSP—(Service Switching Point) A node in an IN normally associated with an end office and equipped with AIN software. A SSP is generally a central office enhanced with Common Channel Signaling No. 7 (CCS7) messaging links which permit it to communicate with application data bases such as Service Control Points (SCP's). Predefined Call Processing Triggers in the SSP AIN software result in the SSP initiating queries to network SCP's for information regarding completing call processing of a particular call.

SCP—(Service Control Point). A centralized network element in the IN that individual switches call upon to obtain information and commands necessary for completing a call. The SCP is the intelligence center in a CCS7 network which processes queries for information and returns a response to the originator of the query. The SCP controls service offerings such as Virtual Private Network (VPN) discussed in greater detail below.

IP—(Intelligent Peripheral). An element that generally only controls a special set of features or provides a specialized set of functions to support features.

MSC—(Mobile Switching Center). A switch which controls the operation of a cellular or wireless system and is the network entity that provides the actual call capability to a wireless terminal.

HLR—(Home Location Register). An element in a wireless network in which a mobile (wireless telephone) subscriber's main database entry resides. Information in the HLR generally includes the subscribers profile and where the subscriber's mobile terminal is currently located.

VLR—(Visiting Location Register). An element in a wireless network often co-located with a MSC and used by the network to update a subscriber's HLR with the whereabouts of the subscriber's wireless terminal. It is also involved in call delivery to the wireless terminal.

DN—(directory number). A number that identifies a particular terminal in a wireless or wireline network. A DN may include, in sequence, a three digit area code, a three digit region code, and a four digit extension.

MSISDN—(mobile station directory number). The mobile station version of a DN.

End user—A caller who is identified to the SCP for VPN service. To be allowed to initiate a VPN call, the end user must be registered with the VPN and is hence associated with the subscriber of the service.

Subscriber/Customer—The VPN subscriber is the company or corporation who rents or leases the VPN service from the operating company. The subscriber determines the VPN feature types and final call treatments and subscribes to them through the Service provider. The set of features and options allocated for a particular subscriber can be modified or replaced under various circumstances. The subscriber may call the service provider to change this information. There is no specific limit to the total number of subscribers allowed, subject to total, multi-service system engineering constraints.

It is understood, however, that the present invention may be implemented in many different types of networks, including networks that conform to different specifications such as US specifications, European specifications, and so forth.

II. Exemplary Network

Referring to FIG. 1, a wireless network 10 is configured as an IN network and connected to an intelligent control center 12. A first conventional wireline network 14 is connected directly to the wireless network 10 via a conventional gateway GMSC 16 and indirectly therethrough to the intelligent control center 12. A second wireline network 18 is configured as an IN network, and is directly connected to both the wireless network 10 and the intelligent control center 12. The wireless network 10 has conventional wireless terminals such as telephones 20a, 20b, 20c visiting an MSC 22 (configured as an SSP); the wireline network 14 has conventional wireline terminals such as telephones 24 and a computer 26 connected to a switch 30; and the wireline network 18 has conventional wireline terminals such as telephones 32a, 32b and a computer 34 connected to a switch 36. Either of the computers 26 and 34 may be an answering machine, a voice mail box, or a personal computer configured to receive and send fax and other data transmissions as well as voice messages.

The switch 36 of the wireline network 18 is configured as an SSP. Likewise, the gateway GMSC 16 is also configured as an SSP and is connected to an HLR 40, an IP 42 and SCP 44. The SCP 44 and IP 42 are configured as centralized intelligent network elements of the intelligent control center 12. Alternatively, the services provided by the SCP 44 and IP 42 may be provided by the gateway GMSC 16.

Communications between the MSC's 16, 22 and the SCP 44 are carried by lines 45. Communications between the MSC's 16, 22 and the IP 42 are carried by lines 46. Communications between the HLR 40 and the GMSC 16 are carried by line 48. Communications between the HLR 40 and the MSC 22 are carried by lines 50. Communications between the GMSC 16 and the MSC 22 are carried by lines 52. Communications between the SCP 44 and the IP 42 are carried by lines 56. Several additional lines are not shown for the sake of brevity and clarity.

The signaling between the MSCs 16, 22 and the SCP 44 uses ETSI Intelligent Network Application Protocol (INAP), as defined by ETSI pr ETS 300 374-1 standards. The signaling between the MSC's 16, 22 and the IP 42 uses a primary rate interface (PRI). It is understood that the specific standards and protocols described above are merely exemplary.

The intelligent control center 12 is connected to, or includes functionality for, a Virtual Private Network (VPN) service provider 70 through a bus 72. The VPN provider 70 may include a service management system (SMS) 74, an operations and maintenance (OAM) node 76, a service creation environment (SCE) node 78, and a service order provisioning (SOP) node 79. The SMS 74 is an IN node that provides service provisioning capabilities, such as for entering subscriber data for services as well as support data. The information from the SMS 74 is stored in a database (not shown) and then relayed to the SCP 44. The OAM node 76 is an IN node that stores and reports logs, operations measurements, and alarms to requested entities. The SCE node 78 is an IN node that provides an environment for creating service logic. The SOP node 79 provides a data-filling interface to the SCP through the SMS 74. For example, the SOP 79 allows the service provider to suspend, reactivate or remove the service for any of the existing VPN subscribers.

VPN is a collection of corporate services that provides private network features to callers outside of the private network. For example, corporations can distribute wireless telephones to their employees, providing them with many of the services that they use on their existing private network. For the sake of clarity and consistency, the remaining discussion will be limited to VPN calls from VPN end users using wireless telephones. It is understood, however, that different types of telephones, including wireline telephones, are anticipated.

Central to the VPN service is the concept of a dialing plan. The wireless telephones are uniquely addressed by private numbers, that can be defined by the customer. A VPN call can be placed from a private number to either a public number or another private number belonging to the same customer. The dial plan specifies the private numbering scheme and the dialing procedures that have to be followed. One main function of the service, then, is to translate a private number into its public number counterpart.

The VPN service permits a business or corporation to subscribe to capabilities such as private numbering plan and calling features such as forced on-net and originating call screening. The service allows the subscriber to define a private numbering plan so that a group of end users who are affiliated with the business subscriber may have universal access to the private numbering plan. Each end user in the group can then use this private numbering plan to originate calls that will be processed and accounted for as VPN calls. The network distinguishes between calls to private numbers and calls to regular public switched telephone network (PSTN) numbers based on the number dialed in the defined VPN service.

VPN end users are able to originate calls directly from their registered wireless telephone. This form of access is referred to as On-net access. From On-net access, a VPN end user is able to originate a VPN call to a number which terminates to a destination within the same VPN group as the originating end user. This type of VPN call is referred to as an On-net call. Additionally, a VPN end user may be provided with the ability to originate a VPN call to a number which terminates to a destination outside of the end user's VPN. This type of VPN call is referred to as an Off-net call.

A. MSC/SSP Functionality for all VPN features

No dedicated facilities are required for routing of VPN calls. Instead, VPN calls route over public facilities like all other wireless telephone calls. The MSC/SSP may be optionally configured to perform called number screening for Type II Emergency number and/or escape codes in the VLR prior to SCP triggering. This screening is performed on a subscriber basis via existing functionality.

B. SCP Functionality for all VPN Features

When the SCP receives an initial query from an SSP, it decodes the message and builds a record key using the service key and, for this particular service, the Calling Party ID (MSISDN). This implies that there is a one-to-one correspondence between users and subscriber records, allowing the flexibility of customization for each user. For example, this approach could be used to provide unique VPN capabilities to the individual managers in a department.

The SCP executes the features for the given subscriber record and encodes an appropriate response to return to the SSP (i.e. Connect, Continue, or ReleaseCall).

C. Data Requirements on the SCP

The SCP needs to store the following information regarding subscriber(s) and users of the VPN service. The SCP has two kinds of data-subscriber and supporting. If data is stored in support tables it can be accessed from a number of decision graphs (not shown). If data is stored in a subscriber record, it is only accessible by the service logic also imbedded in the same subscriber record (i.e. one subscriber record contains logic and data). Service processing efficiency is higher if data is held in subscriber records rather than requiring to be accessed in support tables.

D. General Methodology

Referring to FIG. 2, a method 100 illustrates, in general, how many of the features of the VPN are provided to the end user. At step 102, a VPN end user (a caller) initiates a call. Using the network configuration of FIG. 1, a caller using the telephone 20a connects with the MSC/SSP 22. At step 104, the SSP 22 initiates a query to the SCP 44 and at step 106, the SCP determines if the caller 20a is a predefined user of VPN service.

If so, at step 108 the SCP 44 retrieves information, using the caller ID and MSISDN from the caller 20a. At step 109, the SCP 44 translates and normalizes the DN. At step 110, the SCP 44 provides the retrieved information to the SSP 22. The information may be a number for a dialed party, billing information, call prohibitors, or other information described in greater detail below.

Upon completion of step 110 or upon a negative determination at step 106, execution proceeds to step 112 where the SSP 22 completes the call (if allowed by the SCP 44). For example, the SSP 22 connects with the SSP 30 to connect the caller 20a to the telephone 24a.

III. Services

A. Private Numbering Plan

VPN wireless users with a Private Numbering Plan (PNP) can have access to the same corporate numbering plan as their fixed network colleagues. They can reach all members of the corporate private network by dialing their usual internal number instead of the longer, harder to remember, public number.

Most multi location corporation PNPs include a prefix which indicates the site of the subscriber (his physical location for fixed lines) and an extension which specifies the line. To allow for VPN end users to be integrated into their PNPs, two types of access are supported catering for different corporate dialing strategies: uniform and subscriber based.

VPN also supports PNPs for single site corporations which generally do not require any prefix dialing.

1. VPN On-net Calls (Registered Exchange Dial Plan)

This option discusses a PNP by which a Mobile Office concept can be applied in wireless networks. The registered exchange numbering plan offers a non uniform dialing option to reach different regions within the VPN of a wireless telephone subscriber. No matter where they are, wireless telephone subscribers dial as if they were within the region where they originally registered/subscribed. In other words, wireless telephone subscribers do not have to dial the Region Code when it is the same as their own. The PNP specifies the digits that must be dialed in order for a VPN end user to originate a VPN call.

Referring to FIGS. 1 and 2, for the sake of example, assume that a company subscriber has a private network serving two office locations: one in Richardson, Texas and one in Ottawa, Ontario. The Richardson office is serviced by the wireline network 14 and wireless network 10 while the Ottawa office is serviced by the wireline network 18. Each office is assigned a region code, e.g., 444 for Richardson and 445 for Ottawa. Often, the region code corresponds to the three-digit prefix assigned to each extension of the corresponding network. The users are designated by the extension and telephone they are using.

If the Richardson user 24 calls the Ottawa user 32a, he would dial 445-1111 where 1111 is user 32a's assigned 4 digit number. Depending on the preference of the user or the service provider, an on-net prefix may be required before the DN (e.g., "0-445-1111") to designate a VPN call or alternatively, an off-net prefix may be required to designate a PSTN call, User 20a, who is a user of VPN, would also be able to dial the same number (e.g., 445-1111) to reach user 32a from anywhere while he is roaming (even while in Ottawa). That is, from user 20a's point of view, the same DN that he dials from the network 14 can be used to reach user 32a, regardless of user 20a's location. See Table 1, below.

TABLE 1

| Step | Action |
| --- | --- |
| 1 | User 20a provides the number "(0)-445-1111" to the SSP 22 in an attempt to connect to user 32a. |
| 2 | SSP 22 sends the number "445-1111" to the SCP 44. |
| 3 | The SCP 44 determines that the caller is a member of the VPN. |
| 4 | The SCP 44, using the PNP of the VPN, analyzes the called number and determines that it is an on-net call. |
| 5 | The SCP 44 send the SSP 22 the number "613-763-1111", which is the public number for user 32a. |
| 6 | The SSP 22, using the number "613-763-1111", forms a connection with SSP 36. |
| 7 | The SSP 36 completes the call to user 32a. |
| 8 | The SSP 22 bills the call to the subscriber (as differentiated from calls made outside of the VPN which are billed to user 20a). |

For user 20a to call user 24, user 20a would not need to append any region code to user 24 four-digit extension (1111 in the present example), even if user 20a is roaming outside of a "home area" of the wireless network 10 and even if user 20a is roaming in Ottawa. See Table 2, below.

TABLE 2

| Step | Action |
| --- | --- |
| 1 | User 20a provides the number "1111" to the SSP 22 in an attempt to connect to user 24. |
| 2 | SSP 22 sends the number "1111" to the SCP 44. |
| 3 | The SCP 44 determines whether the caller is a member of the VPN. |
| 4 | The SCP 44, using the PNP, determines that the call is on-net and normalizes the dialed digits. |
| 5 | The SCP 44 send the SSP 22 the number "972-684-1111", which is the normalized (public) number for user 24. |
| 6 | The SSP 22, using the number "972-684-1111", forms a connection with SSP 30. |
| 7 | The SSP 30 completes the call to user 24. |
| 8 | The SSP 22 bills the call to the subscriber (as differentiated from calls made outside of the VPN which are billed to user 20a). |

When Ottawa user 32a dials 1111, however, he would reach Ottawa user 32b whose number is 445-1111. Therefore, translations for user 20a dialing 1111 differs from translations for user 32a dialing 1111.

2. VPN On-Net Calls (Uniform PNP)

This option discusses a PNP that is geographically independent, unlike the previous one. The uniform numbering plan offers a consistent dialing option to the different regions within the VPN of the wireless telephone subscriber. No matter where they are, wireless telephone subscribers have to dial the Region Code (if one exists).

A small VPN may have unique numbers for each subscriber in the network regardless of his/her location. In such a case, the subscriber need not know what region code the to dial or what location the called party is located in. This dialing plan is for calls made from one VPN subscriber to another.

Referring again to FIG. 1 and the example above, where some Richardson and Ottawa offices form a VPN, because each user has a unique number, a subscriber just needs to dial a single four-digit extension (e.g., 1111) regardless of the caller's or the called party's location.

3. Registered Exchange Numbering Plan

With a Subscriber Based Numbering Plan, VPN end users need only dial the extension number (no prefix) to reach users that have the same prefix as theirs. When calling other users, they have to dial the complete private number (on-net prefix+prefix+extension).

B. Off-net Calling

VPN end users with Off-net Calling are allowed to call public numbers that are outside the corporate private network. Generally, access to public DN's requires an escape code, such as dialing a specific off-net prefix (e.g. '0') before the actual public number. However, based on dial-plan requirements, the use of an escape code may not be necessary. See Table 3, below, for another example using the network defined and used in Tables 1 and 2 above.

TABLE 3

| Step | Action |
|---|---|
| 1 | User 20a provides the number "613-763-2222" to the SSP 22 in an attempt to connect to user |
| 2 | SSP 22 sends the number "6-613-763-2222" to the SCP 44. |
| 3 | The SCP 44 determines that the caller is a member of a VPN. |
| 4 | Based on the PNP, the SCP 44 determines that the number "613-763-2222" is to an off-net location. |
| 5 | The SCP 44 send the SSP 22 the number "613-763-2222". |
| 6 | The SSP 22, using the number "613-763-2222", forms a connection with SSP 30. |
| 7 | The SSP 30 completes the call to user 24a. |
| 8 | The SSP 22 bills the call to the user 20a. |

C. Forced On-Net Calling

When a VPN end user provisioned with Forced On-Net Calling makes a call to a member of the corporate private network using their public number (he must also be provisioned with Off-Net Calling), the feature recognizes the call as a private call and treats it as such (appropriate billing, etc.).

This feature requires that the customer subscribe to the Off-Net Calling feature (in order to subject calls to off-net location to VPN processing). The basic functionality is as follows:

(1) The caller dials the full PSTN number of a wireless telephone within their VPN.

(2) The SSP triggers and launches a query to the SCP.

(3) The Forced On-Net algorithm determines that the Called Party is a member of the Caller's VPN.

(4) The SCP instructs the SSP to route and bill the call as if the caller had dialed the private number of the Called Party.

D. Special DN Dialing

This feature allows the subscriber to define specific private numbers that belong to a serving area or location area and prefix the private number with the appropriate digits depending on the serving area. This allows a special DN call to be routed to a normalized number that corresponds to the current location of the caller. Such a feature can be used for nearest attendant routing.

The location from where the call originated maps to a logical location zone. Provisioning and maintenance of data is simplified if a logical location zone is defined the same as a conventional Location Area Identifier (LAI). For example a caller could dial '1000'. Assuming the call originates from a location number (for example, 44-61-01-333) which maps into a logical location zone '4', the dialed number is changed to '444-1000.' This seven digit number would then be normalized into the appropriate MSISDN or PSTN DN. Similarly, if the call originated from a logical location zone of '5', the dialed number may be changed to '555-1000' which would normalize into its unique corresponding MSISDN or PSTN DN.

E. Call Screening

This VPN service provides a generic screening capability that can be used to match specific call parameters against predefined lists. If a match is found between the designated call parameter and an entry in the list, then the service logic will branch to the "match logic". Depending upon the service logic requirements, this match branch can typically be used to allow the call to proceed, to block the call or to select a different destination.

Although flexibility exists in selecting the screening objects, functionality to the operator will provide screening based on the originator's MSISDN, the originator's physical location (cell) and the destination number.

The basic screening capabilities provided are:

Screening on the originating wireless telephone identification (origin dependent routing, ODR)

Screening based on the requested destination (destination dependent routing, DDR)

Screening based on originating location or cell (location dependent routing, LDR—a derivative of ODR)

F. White List

VPN end users with a White List can only place calls to numbers listed on the White List. The White List may be common to all users or may be organized into groups, with each group having its own White List. The White List may consist of individual numbers or include whole ranges by identifying the first part of the number as a pattern to be matched.

G. Black List

VPN end users with a Black List may not place calls to numbers listed on the Black List. The Black List may be common to all users or they may be organized into groups, with each group having its own Black List. The Black List may consist of individual numbers or include whole ranges by identifying the first part of the number as a pattern to be matched. Also, the Black List can be used to restrict calling to specific corporate locations.

H. Origin/Destination Dependent Routing

1. Origin Dependent Routing

Origin Dependent Routing is a VPN feature that allows subscribers to screen and optionally route calls based on the calling party number. If the calling party number matches the subscriber's origination criteria, the SCP query processing branches to the specified match service logic. Otherwise, execution branches to the specified default service logic. The one use of this feature is to be able to prevent calls being made by certain wireless telephones, generally as a temporary measure rather than removing them from the VPN group and it can be used to provide user specific functions from within a group decision graph.

Origin Dependent Routing relies on the Calling Party Number (CPN) parameter in the query that is sent from the SSP to SCP. If the CPN is not present in the incoming query, then SCP query processing branches to the specified Default service logic. The CPN will be the MSISDN or wireline calling party number, as received by the SSP.

The origin dependent routing feature can have partial or full MSISDNs or wireline numbers in the ODR list for determining a match with the subscriber's criteria. All numbers in the list, whether they are partial or complete, are expected to begin with a country code.

2. Destination Dependent Routing

Destination Dependent Routing (DDR) is a VPN feature that allows screening of calls based on the destination dialed. The basic intent of the feature is to prevent calls being made to specific destinations. A list of destination DNs to be screened is defined and scanned for each call if this feature is active. If the destination DN matches the value in the screening list, the SCP query processing branches to the specified match service logic. Otherwise, execution branches to the specified default service logic.

DDR Screening relies on the dialed number as supplied to the VPN in the TCAP query. Matching will be carried out on the full/partial length of the Private (as per the subscriber fixed length) or public number. Again, the public numbers in the list, whether they are partial or complete, are expected to begin with a country code.

3. Location Number Routing

Location number routing works similar to serving areas where location numbers can be grouped together to form a logical zone. Each subscriber can specify logical zones from which calls cannot (or can) originate for that particular subscriber. The location information of the calling party is stored in the Location Number parameter of the InitialDP operation. If the location number data of the originator is found in the list of matching logical zones, query processing branches to the match service logic. Otherwise execution branches to the specified default service logic.

I. Gold/Silver Access

On a per subscriber basis, specific numbers can be designated as customer care agents. When a user dials one of these customer care numbers, he/she is routed to a customer care agent.

Gold/Silver Access feature allow the operator to provision, on a per user basis, a gold or silver access indicator. Based on the indicator, the caller will be routed to a different customer care agent.

For example, if the customer care agent is accessed by dialing '0', a user who is provisioned for gold access will be routed to a different private number than a user who is provisioned for silver access. Language preference for customer care agents is managed through the assignment of DNs. Each user can therefore select a language preference related to the customer care agents.

J. Time Routing

With Time Routing, some specific numbers can be configured to route calls differently depending on the time of the day, day of the week, day of the year or whether the day is statutory holiday. This can be used for instance to route calls to a certain attendant during work days and to another attendant during nights, weekends and holidays.

K. Time Screening

Time Screening is used to restrict access to the VPN to certain times of the day, days of the week, days of the year or outside statutory holidays. For instance, the Virtual Private Network can be made available only during workdays. Additionally, Time Screening may only apply to certain users or restrict certain services such as Off-net Calling.

1. Holiday Routing

Holiday Routing allows subscribers to define special routing of calls on one or more collections of statutory holidays, within specified time regions. If a call arrives on one of the specified statutory holidays, then the call is routed according to the subscriber's holiday service logic. In all other cases, the call is processed according the subscriber's Default routing logic.

Statutory holiday lists are maintained by the service provider on a service-wide basis. Each statutory holiday list is identified by an unique Statutory Holiday Identifier.

2. Day of Year Screening

The Day of Year screening feature allows incoming calls to be screened based on the subscriber's day of year. Day of Year screening compares the subscriber's current date with a number of specified ranges of days of the year. If a match occurs, then query executing branches to the match logic path, otherwise the default logic path is executed.

3. Day of Week Screening

The Day of Week Screening feature allows incoming calls to be screened based on the subscriber's weekday. Day of Week screening compares the subscriber's current weekday with a number of specified ranges of days of the week, if a match occurs, then query execution branches to the Match logic path, otherwise the Default logic path is executed.

4. Time of Day Screening

The Time of Day screening feature allows incoming calls to be screened based on the subscriber's current time. time of Day screening compares the subscriber's current time with a number of specified time of day ranges. If a match occurs, then query execution branches to the Match logic path, otherwise the Default logic path is executed.

5. Time Regions

The Time Region information for the calling party for the above screening is based on the time region associated with the current location of the calling party if the calling party is a wireless telephone user. Otherwise, the time region is based on the home location of the caller. Time Region information for the called party is based on the home location specified for the called party.

It is not necessary to update subscriber data as time region information changes, as this data is stored in a system wide Time Region table referenced by all Time Dependent Routing features. This table comes predefined as shown in the present disclosure, but may be altered by the Service Provider if necessary.

The subscriber's current time of day/day of week/day of year is determined through the use of the Time Region supporting data table. This table contains an entry for each geographic region that the Service Provider serves. Within each entry there is a field which specifies the time offset between the regional time and that of Greenwich Mean Time (GMT). As well, the table entry contains a flag to indicate whether or not daylight savings is observed within the region. In the case when daylight savings is observed, then the offset between daylight savings time in the region and GMT is contained within the table entry. The start and end times for the daylight savings period are also defined for each subscriber region in which daylight savings period are also defined for each subscriber region in which daylight savings occurs. The subscriber's current date is then calculated by applying either the regional time offset or the daylight savings time offset to GMT.

L. Privileged Routing

With Privileged Routing, specific numbers can be configured to route calls differently depending on the identity of the caller. For instance, a common number (e.g. '9') can be advertised as an attendant number. When dialed, this number could route to a different attendant depending on the identity of the caller. This way, different users can be provided with a different quality of service, calls can be answered in different languages, etc.

M. Percent Distribution

Percent Distribution allows the distribution of calls made to a single private number to a set of numbers, following a given distribution rule (e.g. 30% of the calls to the first number, 60% to the second and 10% to the third).

Percent distribution is an SCP feature that causes incoming calls to be routed to one of a number of subscriber destinations or subsequent features, based on a pre-defined, fixed percentage of the total calls to a single number.

Each destination will receive a proportion of the incoming calls that converges to the defined percentage for a sufficiently large volume of calls. As the number of calls increases, each routing pair will receive calls approaching the percentages defined for the subscriber.

N. Alternate Billing Number

When a user is provisioned with Alternate Billing Number, his calls are billed to another number, rather than his own number. This may apply to all calls, or be limited to:
certain times of the day, days of the week, days of the year or statutory holidays;
certain numbers dialed, or range of numbers dialed.

This feature allows the customer to bill a call against any number not associated with the calling number. It will provide a means by which all calls from a designated wireless telephone or a group of wireless telephones can be billed to the one number.

O. Alternate Profile

With Alternate Profile, a single user may have two different VPN profiles (usually corresponding to different roles such as business and private). Determination of which profile to use for a given call is done based on a prefix dialed for the Alternate Profile.

P. Closed User Group

Users may be organized in groups and subject to Closed User Group (CUG) restrictions. Closed User Group users can only call other members of the same group. Additionally, users of this group can only receive private network calls of the same group. Groups can be set up such that certain users of the Virtual Private Network may belong to several groups.

This feature allows a subscriber to group together end users such that the members within a group can only originate calls to other members within the same group. An end user who originates a call to a destination which is outside of the CUG shall be blocked.

A user may belong to up to four closed user groups. Each VPN owner can define from 0-999 CUG's.

Q. Direct to Voice Mail

Direct to Voice Mail allows a user to dial his own private number and be automatically routed to his voice mail box, as opposed to having to remember a different access number. This feature allows a user to dial his own private number and be automatically routed to the voice mail system. The user does not need to remember a separate number to access voice mail. The called party ID in the billing record will reflect the voice mail system and can be billed accordingly.

R. Hotline

If a given user is provisioned with Hotline, all calls that he originates will be routed to a predefined number (the <<Hotline number>>), independently of the digits dialed. Hotline provides a capability for the user or operator to provision a specific private or public number against the user such that all originations from that user are routed directly to the Hotline DN. In this case, any dialed digits are ignored.

S. Billing Strategy

Billing records for calls made using Virtual Private Network indicate whether the call is on-net (i.e. within the corporate private network) or off-net, what the alternate billing number is (if any), if a PIN was used, a business group identifier, a service identifier, and the caller's private number.

T. Off-net Access

Virtual Private Network allows a user to originate a call via a GSM subscriber or a wireline phone which are not registered with the Virtual Private Network. The user dials a Virtual Private Network Service Access Code, and enters his caller identification an a PIN. After verification the user is able to call the on-net or the off-net number according to his/her privileges.

U. Account Code

Virtual Private Network allows users to enter a service profile identifier (SPI) when dialing numbers, allowing either a private or a business set of VPN features to be executed. This feature allows a user to specify which profile to use on a per call basis. Based on a specific prefix digit, the service logic on the SCP will determine whether to use the business profile for that user or the private profile. The business profile will always be the default.

The prefix digit must be specific and unique to the PNP for that subscriber. For example assume the prefix digits are '6*'. The SCP would assume that any dialed number beginning with a '6*' would indicate to use the user's private profile. Prefix digits for Business/Private Account may be delimited by an asterisk ("*")

| Dialed Digits | | Profile |
| --- | --- | --- |
| 6*12345 | → | Private |
| 12345 | → | Business |

The key point is that the prefix digit will not be considered as part of the true dialed, private number. If private account of the originator is executed, private account for the called party will also be executed, if one exists.

V. Abbreviated Dialing

Virtual Private Network allows individual users to define short codes for certain numbers (within or outside the corporate network) to permit faster dialing of frequently used numbers.

W. Call Forward

Virtual Private Network allows users to register call forwarding using the PNP, and activate and deactivate it both from their own wireless telephone and from off-net access.

Although illustrative embodiments have been shown and described, a latitude of modification, change and substitution is intended in the foregoing disclosure, and in certain instances, some features will be employed without a corresponding use of other features. Furthermore, additional features, such as error handling routines, may be added to the illustrative embodiment without altering the scope of the embodiment. Accordingly, it is appropriate that the appended claims be construed broadly.

What is claimed is:

1. In a telecommunications network including a service switch point, a service control point, and a first and second telephone, a method for providing a virtual private network for the first and second telephone comprising the steps of:

storing an identifier for the first telephone in a memory accessible by the service control point;

receiving a first dialed number from the first telephone into the service switch point;

querying the service control point to determine if the identifier for the first telephone is in the memory;

if the identifier for the first telephone is in the memory, interpreting the first dialed number to a second dialed number, the second dialed number being assigned to the second telephone;

providing the second dialed number to the service switch point;

instructing the service switch point to connect the first and second telephones using the second dialed number; and if the first and second telephones have disconnected an the first telephone dials a third telephone:

receiving a third dialed number from the first telephone into the service switch point;

querying the service control point to determine if the identifier for the first telephone is in the memory;

if the identifier for the first telephone is in the memory, interpreting the third dialed number to a fourth dialed number, the fourth dialed number being assigned to the third telephone, and the third dialed number being a subset of the first and second dialed number;

providing the fourth dialed number to the service switch point;

instructing the service switch point to connect the first and third telephones using the fourth dialed number.

2. A method according to claim 1 wherein the first telephone is a wireless telephone.

3. A method according to claim 1 wherein the second telephone is part of a private network and the first dialed number is assigned to the second telephone by the private network and wherein the first and second numbers are different.

4. A method according to claim 1 wherein the first dialed number is shorter than the second dialed number.

5. A method according to claim 1 wherein the first number includes a region code for identifying the second telephone.

6. A method according to claim 2 wherein the first telephone has a home region and further comprising the step of:

if the first dialed number does not include a region code, providing a region code for interpreting the second dialed number, the region code corresponding to the home region.

7. A method according to claim 1 further comprising:

if the identifier for the first telephone is not in the memory, allowing the service switch point to connect the first and second telephones using the first dialed number.

8. The method of claim 1 further comprising, if the second telephone concurrently dials a fourth telephone with the third dialed number:

storing an identifier for the second telephone in a memory accessible by another service control point;

receiving the third dialed number from the second telephone into another service switch point;

querying the another service control point to determine if the identifier for the second telephone is in the memory;

if the identifier for the second telephone is in the memory, interpreting the second dialed number to a fourth dialed number, the fourth dialed number being assigned to the fourth telephone;

providing the fourth dialed number to the another service switch point; and instructing the another service switch point to connect the second and fourth telephones using the fourth dialed number.

9. A programming product for use in a telecommunications network including a service switch point, a service control point, and a first and second telephone, the software product providing a virtual private network for the first and second telephone and comprising:

instructions for storing an identifier for the first telephone in a memory accessible by the service control point;

instructions for receiving a first dialed number from the first telephone into the service switch point;

instructions for querying the service control point to determine if the identifier for the first telephone is in the memory;

instructions for interpreting the first dialed number to a second dialed number, the second dialed number being assigned to the second telephone responsive to a determination that the identifier for the first telephone is in the memory;

instructions for providing the second dialed number to the service switch point; and instructions for instructing the service switch point to connect the first and second telephones using the second dialed number;

instructions for, if the first and second telephones have disconnected and the first telephone dials a third telephone:

receiving a third dialed number from the first telephone into the service switch point;

querying the service control point to determine if the identifier for the first telephone is in the memory;

if the identifier for the first telephone is in the memory, interpreting the third dialed number to a fourth dialed number, the fourth dialed number being assigned to the third telephone, and the third dialed number being a subset of the first and second dialed number;

providing the fourth dialed number to the service switch point;

instructing the service switch point to connect the first and third telephones using the fourth dialed number; and wherein the first telephone is a wireless telephone, the second telephone is part of a private network and the first dialed number is assigned to the second telephone by the private network and wherein the first and second numbers are different.

10. A programming product according to claim 9 wherein the first telephone has a home region and further comprising:

instructions responsive to whether the first dialed number does not include a region code, for providing a region code for interpreting the second dialed number, the region code corresponding to the home region.

11. A programming product according to claim 9 wherein the service switch point is allowed to connect the first and second telephones using the first dialed number if the identifier for the first telephone is not in the memory.

12. A programming product according to claim 9 wherein the first telephone is a wireless telephone.

13. A programming product according to claim 9 wherein the second telephone is part of a private network and the first dialed number is assigned to the second telephone by the private network and wherein the first and second numbers are different.

14. A programming product according to claim 9 wherein the first dialed number is shorter than the second dialed number.

15. A programming product according to claim 9 wherein the first number includes a region code for identifying the second telephone.

16. A programming product according to claim 9 further comprises, if the second telephone concurrently dials a fourth telephone with the third dialed number, instructions for:

storing an identifier for the second telephone in a memory accessible by another service control point;

receiving the third dialed number from the second telephone into another service switch point;

querying the another service control point to determine if the identifier for the second telephone is in the memory;

if the identifier for the second telephone is in the memory, interpreting the second dialed number to a fourth dialed number, the fourth dialed number being assigned to the fourth telephone;

providing the fourth dialed number to the another service switch point; and instructing the another service switch point to connect the second and fourth telephones using the fourth dialed number.

\* \* \* \* \*